INVENTOR.
Paul E. McKamy
BY Charles M. Sindnott
ATTORNEY

Patented Sept. 26, 1950

2,523,441

UNITED STATES PATENT OFFICE 2,523,441

WASHER FOR GASES

Paul E. McKamy, Chicago, Ill.

Application March 15, 1948, Serial No. 15,007

13 Claims. (Cl. 183—19)

This invention relates to improvements in washers for gases, such as air or other gaseous substances, and more particularly relates to an improved washer of the stationary tower type.

The principal object of my invention is to provide a new and improved form of gas washer of a novel and efficient construction so arranged as to successively treat and wash gas or air by impinging, spraying and packed filtering so as to entirely remove all of the dust present in a stream of gas or air.

Another object of my invention is to provide a novel and efficient form of tower gas washer so arranged as to completely saturate the incoming gases and encase the very small micron size dust particles with water vapor so as to cause the gas films surrounding the dust particles to become intermingled or dissolved in the water vapor, so the vapor will be drawn to the interface of the dust particles, and the particles with minute forms of condensation at their interfaces, will readily adhere to a wet surface and be removed from the gas.

These and other more detailed objects of my invention will appear from time to time as the following specification proceeds and with reference to the accompanying drawings wherein.

Figure 1:
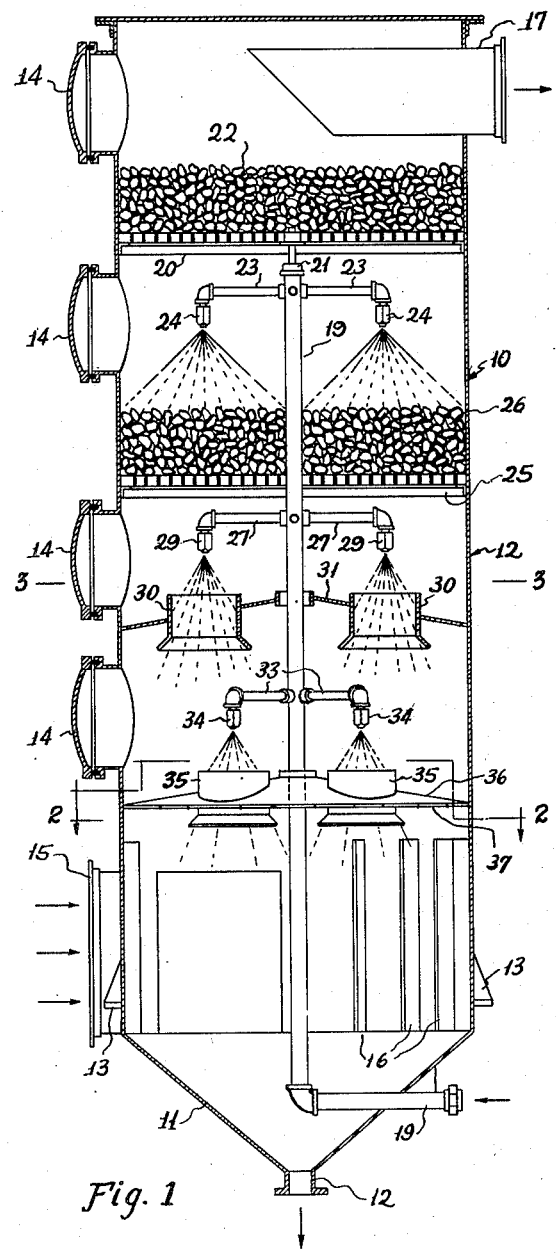
Figure 1 is a diagrammatic vertical sectional view taken through a gas washer constructed in accordance with my invention.
Figure 3:
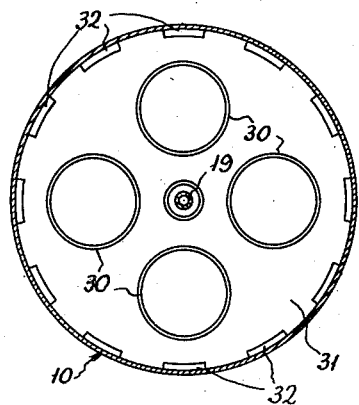
Figure 3 is a partial horizontal sectional view taken substantially along line 3—3 of Figure 1.

In the embodiment of my invention illustrated in the drawing, the gas washer is shown as including a washer tower 10 of a substantially cylindrical form. Said tower is closed at its top and has a bottom 11, herein shown as being of an inverted conical formation and as having a drain or outlet 12 leading from the apex of the cone for draining dirty washing fluid from the washer.

The tower 10 may be supported on a masonry or concrete base or foundation on steel pads 13, 13 extending from its outer periphery, or may be supported on steel legs (not shown) in a manner well known to those skilled in the art. A series of vertically spaced manholes 14, 14 are provided on one side of said tower to permit inspection and cleaning of the interior thereof.

Figure 2:
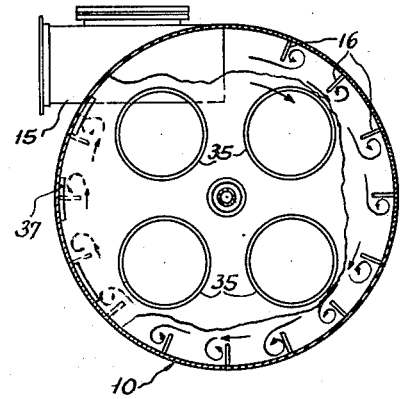
Figure 2 is a fragmentary horizontal sectional view taken substantially along line 2—2 of Figure 1.

An intake duct 15 enters the washer tower 10, just above the inverted frusto-conical bottom 11, and is arranged to direct gas into said tower in a direction tangential to its inner periphery (see Figure 2). A plurality of spaced vertically extending baffle plates 16, 16 extend radially inwardly from the inner periphery of said tower in alignment with the discharge opening of said duct. Said baffle plates serve to set up eddy currents in the dust laden gas entering said tower through said duct, and cause the dust and dirt particles to be impinged against said baffles and inner wall of said tower, so that the washing fluid flowing down the interior of the side walls of said tower will wash the dust particles impinged against said wetted walls and baffle plates downwardly through the drain 12, and effect the first phase of dust removal. An outlet duct 17 is provided at the upper end of said tower, to carry the washed gas away from said tower.

An inlet or supply pipe 19 for the washing fluid, which may be water, enters the lower portion of said tower through the inverted frusto-conical bottom 11 and extends upwardly through the central portion of said tower, to a point just beneath a grating 20 extending across said tower, adjacent its upper end, but spaced a substantial distance beneath said outlet 17. A ceramic packing 22 is laid on the top of said grating at random. Said packing is herein shown as consisting of layers of dry stoneware or semi-porcelain material and serves as an entrainment separator, to prevent fine mist from being blown out of the unit with the washed gas. Said pipe is capped at its upper end by a cap 21, which may be suitably secured to the lower end of said grating, to hold said pipe in place.

A plurality of branch pipes 23, 23 extend radially from the supply pipe 19, adjacent its upper end, and have depending spraying nozzles 24, 24 at their outer ends. Said nozzles may be of any well known form so constructed as to atomize the water into a fine spray of minute particles and are not herein shown in detail, since they form no part of my present invention.

A grating 25 is spaced a substantial distance beneath said nozzles and has a ceramic packing 26 placed thereon at random. Said packing, like the packing 22, consists of stoneware or semi-porcelain material. Said packing is completely saturated with washing fluid by the nozzles 24, 24 and serves to secure an extended surface area over which the liquid and gas can pass in counterflow and to momentarily increase the velocity of the gas as it passes through said packing. This causes a rather violent scrubbing action to take place and impinges any fine dust particles against the packing with considerable force.

A plurality of branch pipes 27, 27 are spaced beneath the branch pipes 23, 23 and extend radially from the supply pipe 19 beneath the grating 25. Spraying nozzles 29, 29 like the nozzles 24, 24 depend from the ends of said pipes and serve to atomize the washing liquid and completely fill spraying throats 30, 30, through which the gas passes, with atomized fluid. Said throats are herein shown as being of a cylindrical formation with outwardly flared lower or entering ends, to receive the incoming gas. Said throats are mounted in a partition 31 of a flattened frustoconical formation. Said partition extends across the inside of said tower and is suitably secured thereto at its edge, and is provided with a plurality of spaced notches 32, 32 along its outer periphery, to permit the washing fluid to drain down the top of said partition and along the side walls of said tower from above.

A plurality of branch pipes 33, 33 extend radially from the supply pipe 19 beneath the spray throats 30, 30, and have spraying nozzles 34, 34 depending from their outer ends, for atomizing the washing fluid and completely filling spray throats 35, 35, like the spray throats 30, 30, with atomized washing fluid. Said spray throats depend from and are mounted in a frusto-conical partition 36, disposed just above the baffles 16, 16. Said spray throats 35, 35 are herein shown as being arranged in staggered relation with respect to said spray throats 30, 30, so as to change the path of the gas as it passes from said lower to said upper spray throats and cause it to split and move in opposite directions before entering said upper spray throats. Said partition 36 is likewise provided with a plurality of notches 37, 37 along its periphery, to allow the washing fluid to drain down the inside of the side walls of said tower and wash dust from the gas in the entering zone of said tower, as has been mentioned before.

In operation of the device, the dust laden gas enters the tower 10 through the inlet duct 15 at a relatively high velocity and is set up into tightly spinning eddy currents by the baffles 16, 16. This will cause a certain amount of the dust and dirt particles in the gas to be impinged against said baffles and the walls of the tower. The washing liquid flowing down said walls and baffles from the sprays above carries said impinged dust with it and effects the first phase of dust removal. From the baffle zone of said tower, the gas will pass upwardly through the spray throats 35, 35, completely filled with sprayed water. This will saturate the incoming gases with water vapor and encase the very small micron size dust particles in water vapor so that the gas films surrounding the dust particles will become intermingled or dissolved in the vapor and the vapor will be drawn into the interface of the dust particle. In this condition the dust particle has a minute film of condensation at its interface which enables it to readily adhere to a wetted surface. From said spray throats 35, 35 the saturated gas divides its path and passes through the spray throats 30, 30, which serve to further saturate the gases, and saturate any particles not saturated when passing through the spray throats 35, 35. The gas then passes through the grating 25 and upwardly through the wetted packing 26. Said packing serves to secure an extended area over which the washing fluid and gas can pass in counterflow and to cut down the effective cross sectional area of the tower and increase the velocity of the gas momentarily as it passes through said filtering bed. This will cause a rather violent scrubbing action to take place and will cause any fine dust particles to be impinged against said packing with considerable force, so said dust particles may adhere to the wet surface of said packing and be free from the gas passing therethrough.

After leaving the packing 26 and the zone of the spraying nozzles 24, 24, the wetted gas passes upwardly through the grating 20 and layers of ceramic packing 22, which serves as an entrainment separator to entrain the fine mist in the tower and prevent any fine mist from being blown from said tower through the outlet duct 17.

It may be seen from the foregoing that a novel and simplified form of tower type gas washer has been employed which has a plurality of cleaning zones and a moisture entrainment zone, each cleaning zone exerting a separate cleaning action on the gas, and that the tower so conditions the atmosphere within it that each minute particle of dust is surrounded by a minute film of condensaion, so the wetted particles may readily adhere to the wet surfaces of the packing 26 and be washed from the gas, and that the entrainment zone serves to remove water vapor therefrom so that a clean gas is exhausted from the upper end of the tower.

It may further be seen that the cleaning operation is a step by step operation and the gas is progressively cleaned as it passes from the bottom to the top of the tower, and that the beds of packing material besides trapping any small dust particles, also serve to materially cut down the size of the tower and make it possible to wash the gas with a tower of less height than would otherwise be possible, if the gas were washed by water alone.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a gas washer, a substantially cylindrical tower having an inlet adjacent its lower end, for the introduction of gas in a direction tangential to its inner periphery and an outlet adjacent its upper end for the exhaust of the washed gas therefrom, a plurality of washing zones between said inlet and said outlet and including spraying devices for completely saturating the incoming gas with atomized washing fluid, as it passes upwardly along said tower from one washing zone to the other, a plurality of baffles extending inwardly from the periphery of said tower, adjacent said inlet, to set up eddy currents in the gas introduced into said tower so the washing fluid draining down the walls of said tower and said baffles will cause the dust impinged against said wall and said baffles to adhere thereto and wash theredown and effect the first phase of dust removal, and a bed of dry random packing disposed beneath said outlet zone and forming a filtering layer for entraining and preventing fine mist from being exhausted through said outlet zone.

2. In a gas washer, a substantially cylindrical tower having an inlet adjacent its lower end for the introduction of gas in a direction tangential to its inner periphery and having an outlet adjacent its upper end for the exhaust of the washed gas therefrom, a plurality of washing zones between said inlet and said outlet including a liquid saturated zone adjacent said inlet having a plurality of baffles extending inwardly from the periphery of said tower for setting up eddy currents in the gas introduced tangentially into said tower and causing the dust in the gas to be impinged against said walls, for effecting the first phase of dust removal, a partition spaced above said baffles and having a plurality of spray throats therein for constricting the gas as it passes therethrough, and spraying devices for completely filling said spray throats with atomized washing fluid, for saturating the gas passing through said spray throats, another partition disposed above said first partition and having a plurality of spray throats therein staggered with respect to said first mentioned spray throats to split and change the path of travel of said gas as it passes upwardly along said tower, spraying devices disposed above said spray throats for completely filling said spray throats with finely divided fluid, layers of random packing disposed above said last mentioned spraying devices, and forming a filtering layer through which the gas passes, spraying devices for completely spraying said packing with atomized washing fluid, said packing serving to increase the velocity of the gas as it passes therethrough and forming an extended area over which the liquid and the gas pass in counterflow, and a bed of dry packing spaced above said last mentioned spraying devices, beneath said outlet, for entraining and preventing fine mist from being exhausted through said outlet with the washed gas.

3. In a gas washer, a substantially cylindrical tower having an inlet adjacent its lower end for the introduction of gas in a direction tangential to its inner periphery and having an outlet adjacent its upper end for the exhaust of the washed gas therefrom, a plurality of washing zones between said inlet and said outlet including a liquid saturated zone adjacent said inlet having a plurality of baffles extending inwardly from the periphery of said tower and setting up eddy currents in the gas introduced into said tower, so the washing fluid draining down the wall of said tower and said baffles will cause the dust impinged against said wall and said baffles to adhere thereto and wash theredown and effect the first phase of dust removal, a partition spaced above said baffles and having a plurality of spray throats therein for constricting the gas as it passes upwardly through said tower, spraying devices spaced above said throats for completely filling said spray throats with finely divided fluid and saturating the gas passing therethrough, another cover plate disposed above said first cover plate and having a plurality of spray throats therein, staggered with respect to said first mentioned spray throats to split and change the path of travel of the gas as it passes upwardly along said tower, and spraying devices for completely filling said spray throats with finely divided fluid, a grating disposed above said last mentioned spraying devices and having random layers of ceramic packing placed thereon and spraying devices for completely spraying said packing with finely divided fluid, said packing forming an extended area over which the liquid and gas pass in counterflow and serving to momentarily increase the velocity of the gas as it passes through said packing so as to cause a violent scrubbing action of said gas to take place.

4. In a gas washer, a substantially cylindrical tower having an inlet adjacent its lower end for the introduction of gas in a direction tangential to its inner periphery and having an outlet adjacent its upper end for the exhaust of the washed gas therefrom, a plurality of washing zones between said inlet and said outlet including a liquid saturated zone adjacent said inlet and having a plurality of baffles extending inwardly from the periphery of said cylinder for setting up eddy currents in the gas introduced tangentially into said tower and causing the dust in the gas to be impinged against said baffles and the inner wall of said cylinder, so the washing fluid washing down said baffles and said wall, will cause the dust to adhere thereto and effect the first phase of dust removal, a partition spaced above said baffles and having a plurality of spray throats therein, spraying devices spaced above said spray throats for completely filling said spray throats with finely divided fluid, another partition disposed above said first partition and having a plurality of spray throats therein staggered with respect to said first mentioned spray throats, so as to cause the gas to change its direction of travel before entering said last mentioned spray throats, and spraying devices for completely filling said spray throats with finely divided fluid and completely saturating the upwardly passing gas, a grating disposed above said last mentioned spraying devices and having random layers of packing placed thereon, and spraying devices for spraying said packing with finely divided fluid, said packing forming an extended area over which the liquid and gas pass in counterflow and momentarily increasing the velocity of the gas as it passes through said packing and causing a violent scrubbing action of said gas to take place, and a grating disposed above said last mentioned spraying devices, beneath said outlet zone, and having random layers of dry packing placed thereon for entraining and preventing fine mist from being exhausted with the gas through said outlet.

5. In a gas washer, a cylindrical tower, a gas inlet adjacent the lower end of said tower arranged to direct the gas therein in a direction tangential to the inner periphery of said tower, and a plurality of radial baffles extending inwardly from the inner periphery of said tower in the zone of said gas inlet, a partition of a relatively flat conical formation disposed above said baffles and extending across said tower, and having a restricting collar extending therethrough and forming a spray throat for confining the gas in its travel upwardly along said tower, a spraying device disposed above said spray throat for completely filling said throat with a finely divided mist, to saturate the gas as it passes therethrough, and said cover having apertured portions at its edges to direct the fluid flowing down the slope of said cover to flow downwardly along the side walls of said tower in said baffle zone and cause the dust impinged against said wall and baffles to adhere thereto and flow downwardly with said fluid, and effect the first phase of dust removal.

6. In a gas washer, a cylindrical tower, a gas inlet adjacent the lower end of said tower arranged to direct the gas therein in a direction tangential to the inner periphery of said tower, and a plurality of radial baffles extending inwardly from the inner periphery of said tower in the zone of said gas inlet, a partition of a relatively flat conical formation extending across said tower and disposed above said baffles and having a plurality of restricting collars extending through and forming spray throats for confining the gas in its travel upwardly along said tower, spraying devices disposed above said spray throats for saturating the gas as it passes therethrough, a spraying and filtering zone disposed above said partition, and the edges of said partition where it joins the wall of said tower forming apertured portions to direct the fluid flowing down the slope of said cover to flow downwardly along the side walls of said tower in said baffle zone and cause dust impinged against said wall and baffles to adhere thereto and flow downwardly with said fluid, and effect the first phase of dust removal.

7. In a gas washer, a cylindrical tower, a gas inlet adjacent the lower end of said tower arranged to direct the gas therein in a direction tangential to the inner periphery of said tower, and a plurality of radial baffles extending inwardly from the inner periphery of said tower in the zone of said gas inlet, a partition disposed above said baffles, said partition being of a relatively flat conical formation and having a plurality of restricting collars extending through and forming spray throats for confining the gas in its travel upwardly along said tower, and spraying devices disposed above said spray throats for saturating the gas with finely divided fluid as it passes therethrough, a spraying and filtering zone disposed above said partition, and the edges of said partition where it joins the wall of said tower being so formed as to form apertured portions, to direct the fluid flowing down the slope of said cover to flow downwardly along the side walls of said tower in said baffle zone and to cause dust impinged against said wall and said baffles, to flow downwardly with said fluid and effect the first phase of dust removal, a grating adjacent the upper end of said tower and a bed of layers of dry random packing on said grating and forming a filtering layer for entraining fine mist mixed with the washed gas and preventing it from being exhausted therewith.

8. In a gas washer, a cylindrical tower, a gas inlet adjacent the lower end of said tower arranged to direct the gas therein in a direction tangential to the inner periphery of said tower, and a plurality of radial baffles extending inwardly from the inner periphery of said tower in the zone of said gas inlet, a partition disposed above said baffles, said partition being of a relatively flat conical formation and having a plurality of restricting collars extending through and forming spray throats for confining the gas in its travel upwardly along said tower, and spraying devices disposed above said spray throats for saturating the gas with finely divided fluid as it passes therethrough, a spraying and filtering zone disposed above said partition, and said partition having notched portions at its edges, to direct the fluid flowing down its slope to flow downwardly along the side walls of said tower in said baffle zone, and to cause dust impinged against said wall to flow downwardly with said fluid and effect the first phase of dust removal, a grating spaced vertically from said spraying devices and having a bed of random layers of packing thereon and a spraying device for spraying said packing with a fine mist, said packing forming an extended filtering area over which the sprayed fluid and gas pass in counterflow, and forming the final washing zone of the gas and serving to momentarily increase the velocity of the gas as it passes through said packing, so as to cause a violent scrubbing action of said gas to take place.

9. In a gas washer, a cylindrical tower, a gas inlet adjacent the lower end of said tower arranged to direct the gas therein in a direction tangential to the inner periphery of said tower, and a plurality of radial baffles extending inwardly from the inner periphery of said tower in the zone of said gas inlet, a partition disposed above said baffles, said partition being of a relatively flat conical formation and having a plurality of restricting collars extending through and forming spray throats for confining the gas in its travel upwardly along said tower, and spraying devices disposed above said spray throats for completely saturating the gas with finely divided fluid as it passes therethrough, a spraying and filtering zone disposed above said partition, and said partition having notched portions at its edges to direct the fluid flowing down its slope to flow downwardly along the side walls of said tower in said baffle zone and to cause dust impinged against said wall to flow downwardly with said fluid and effect the first phase of dust removal, a grating spaced vertically from said spraying devices and having a bed of random layers of ceramic packing thereon and a spraying device for spraying said packing with a fine mist, said packing forming an extended filtering area over which the sprayed fluid and gas pass in counterflow, and forming the final washing zone of the gas and serving to momentarily increase the velocity of the gas as it passes through said packing and to cause a violent scrubbing action of said gas to take place, and a grating disposed above said last mentioned spraying device and having random layers of packing thereon for entraining and preventing fine mist from being exhausted through said outlet with the washed gas.

10. In a gas washer, a cylindrical tower, a gas inlet adjacent the lower end of said tower arranged to direct the gas therein in a direction tangential to the inner periphery of said tower, and a plurality of radial baffles extending inwardly from the inner periphery of said tower in the zone of said gas inlet, a partition disposed above said baffles, said partition being of a relatively flat conical formation and having a plurality of restricting collars extending through and forming spray throats for confining the gas in its travel upwardly along said tower, and spraying devices disposed above said spray throats for saturating the gas with finely divided fluid as it passes therethrough, a partition disposed above said last mentioned spraying devices, said partition being of a relatively flat frusto-conical formation and having a plurality of restricting collars extending therethrough and arranged in staggered relation with respect to said first mentioned collars and forming spray throats, for confining the gas in its travel upwardly along said tower, and spraying devices disposed above said spray throats for saturating the gas with finely divided fluid as it passes therethrough, and the outer margins of said partitions with the inner periphery of said tower forming apertured portions at the edges of said partitions, for directing the fluid flowing down the slopes of said partitions to flow downwardly along the side walls of said tower into the zone of said baffles, to cause dust impinged against said baffles and said wall to flow downwardly with said fluid and effect the first phase of dust removal.

11. In a gas washer, a cylindrical tower, a gas inlet adjacent the lower end of said tower arranged to direct the gas therein in a direction tangential to the inner periphery of said tower, and a plurality of radial baffles extending inwardly from the inner periphery of said tower in the zone of said gas inlet, a partition disposed above said baffles, said partition being of a relatively flat conical formation and having a plurality of restricting collars extending through and forming spray throats for confining the gas in its travel upwardly along said tower, and spraying devices disposed above said spray throats for saturating the gas with finely divided fluid as it passes therethrough, a partition disposed above said last mentioned spraying devices, said partition being of a relatively flat frusto-conical formation and having a plurality of restricting collars extending therethrough and arranged in staggered relation with respect to said first mentioned collars and forming spray throats for confining the gas in its travel upwardly along said tower, and spraying devices disposed above said spray throats for saturating the gas with finely divided fluid as it passes therethrough, said partitions having notched portions at their edges for directing the fluid flowing down their slopes, to flow downwardly along the side walls of said tower into the zone of said baffles, to cause dust impinged against said baffles and said wall to flow downwardly with said fluid and effect the first phase of dust removal, and a grating adjacent the upper end of said tower having a bed of layers of dry random ceramic packing thereon, forming a dry filtering layer for entraining fine mist mixed with the washed gas and preventing it from being exhausted therewith.

12. In a gas washer, a cylindrical tower, a gas inlet adjacent the lower end of said tower arranged to direct the gas therein in a direction tangential to the inner periphery of said tower, and a plurality of radial baffles extending inwardly from the inner periphery of said tower in the zone of said gas inlet, a partition disposed above said baffles, said partition being of a relatively flat conical formation and having a plurality of restricting collars extending through and forming spray throats for confining the gas in its travel upwardly along said tower, and spraying devices disposed above said spray throats for completely saturating the gas with finely divided fluid as it passes therethrough, a partition disposed above said last mentioned spraying devices, said partition being of a relatively flat frusto-conical formation and having a plurality of restricting collars extending therethrough and arranged in staggered relation with respect to said first mentioned collars and forming spray throats for confining the gas in its travel upwardly along said tower, spraying devices disposed above said spray throats for saturating the gas with finely divided fluid as it passes therethrough, said partitions having notched portions at their edges for directing the fluid flowing down their slopes, to flow downwardly along the side walls of said tower into the zone of said baffles, to cause dust impinged against said baffles and said wall to flow downwardly with said fluid and effect the first phase of dust removal, a grating spaced upwardly from said last mentioned spraying devices and having a bed of random layers of ceramic packing thereon, and a spraying device for spraying said packing with a fine mist, said packing forming an extended filtering area over which the sprayed fluid and gas pass in counterflow, and forming the final washing zone of the gas and serving to momentarily increase the velocity of the gas as it passes through said packing so as to cause a violent scrubbing action of said gas to take place.

13. In a gas washer, a cylindrical tower, a gas inlet adjacent the lower end of said tower arranged to direct the gas therein in a direction tangential to the inner periphery of said tower, and a plurality of radical baffles extending inwardly from the inner periphery of said tower in the zone of said gas inlet, a partition disposed above said baffles, said partition being of a relatively flat conical formation and having a plurality of collars extending through and forming spray throats for confining the gas in its travel upwardly along said tower, and spraying devices disposed above said spray throats for saturating the gas with finely divided fluid as it passes therethrough, a partition disposed above said last mentioned spraying devices, said partition being of a relatively flat frusto-conical formation and having a plurality of restricting collars extending therethrough, staggered with respect to said first mentioned collars and forming spray throats for confining the gas in its travel upwardly along said tower, spraying devices disposed above said spray throats for saturating the gas with finely divided fluid as it passes therethrough, said partitions having notched portions at their edges for directing the fluid flowing down their slopes, to flow downwardly along the side walls of said tower into the zone of said baffles, to cause dust impinged against said baffles and said wall, to flow downwardly with said fluid and effect the first phase of dust removal, a grating spaced upwardly from said last mentioned spraying devices and having a bed of random layers of ceramic packing thereon, a spraying device for spraying said packing with a fine mist, said packing forming an extended filtering area over which the sprayed fluid and gas pass in counterflow, and forming the final washing zone of the gas and serving to momentarily increase the velocity of the gas as it passes through said packing and to cause a violent scrubbing action of said gas to take place, and a grating spaced above said last mentioned grating and having a bed of random layers of dry ceramic packing thereon, forming a filtering layer for entraining fine mist mixed with the washed gas and preventing it from being exhausted therewith.

PAUL E. McKAMY.

REFERENCES CITED

The following references are of record in the file of this patent:

UNITED STATES PATENTS

| Number | Name | Date |
|---|---|---|
| 258,451 | Mallett, Jr. | May 23, 1882 |
| 505,977 | Fletcher | Oct. 3, 1893 |
| 1,055,792 | Plock | Mar. 11, 1913 |
| 1,894,744 | Hawley | Jan. 17, 1933 |
| 1,964,357 | Ketterer | June 26, 1934 |
| 2,087,219 | Dorfan | July 13, 1937 |
| 2,160,549 | Kurth | May 30, 1939 |